United States Patent [19]

Hardy et al.

[11] Patent Number: 5,158,415
[45] Date of Patent: Oct. 27, 1992

[54] BRAKE CALIPER SUSPENSION SYSTEM FOR GOLF CARS AND UTILITY VEHICLES

[75] Inventors: Robert E. Hardy, Harrisburg; Troy W. Whitley; Terry A. Adams, both of Sioux Falls, all of S. Dak.; Michael Sjoblom, Armstrong, Iowa; James Torbick; Kelly Ward, both of Estherville, Iowa

[73] Assignee: Sioux Steel Company, Sioux Falls, S. Dak.

[21] Appl. No.: 773,241

[22] Filed: Oct. 9, 1991

[51] Int. Cl.$^5$ ..... F16D 55/227; F16D 65/092g340501
[52] U.S. Cl. ............................. 188/73.32; 188/71.1; 188/73.31; 188/73.33; 192/70.13
[58] Field of Search ............... 188/73.31, 73.32, 73.33, 188/73.34, 73.39, 71.1, 71.3; 192/70.13

[56] References Cited

U.S. PATENT DOCUMENTS

| | | | |
|---|---|---|---|
| 3,298,468 | 1/1967 | Buyze | 188/73.39 X |
| 3,416,634 | 12/1968 | Swift | 188/73.39 X |
| 4,819,767 | 4/1989 | Laird | 188/71.1 X |
| 5,052,525 | 10/1991 | Ekola | 192/70.13 X |

FOREIGN PATENT DOCUMENTS 1459110 1/1966 France ............... 188/73.34

*Primary Examiner*—George E. A. Halvosa
*Attorney, Agent, or Firm*—McAndrews, Held & Malloy, Ltd.

[57] ABSTRACT

A suspension system for brake calipers wherein two brake rods pass through two plates so that the brake rods are aligned parallel to each other. The barke rods are longer than the distance between the two plates so that the ends of the brake rods extend away from the two plates far enough to hold brake calipers in place about the brake discs. Each brake rod further includes compression springs mounted thereon and located between the plates so that when the appropriate spring are compressed, the corresponding ends of the brake rods can be withdrawn from their position holding the caliper. This allows easy and convenient access to the calipers for removal.

4 Claims, 3 Drawing Sheets

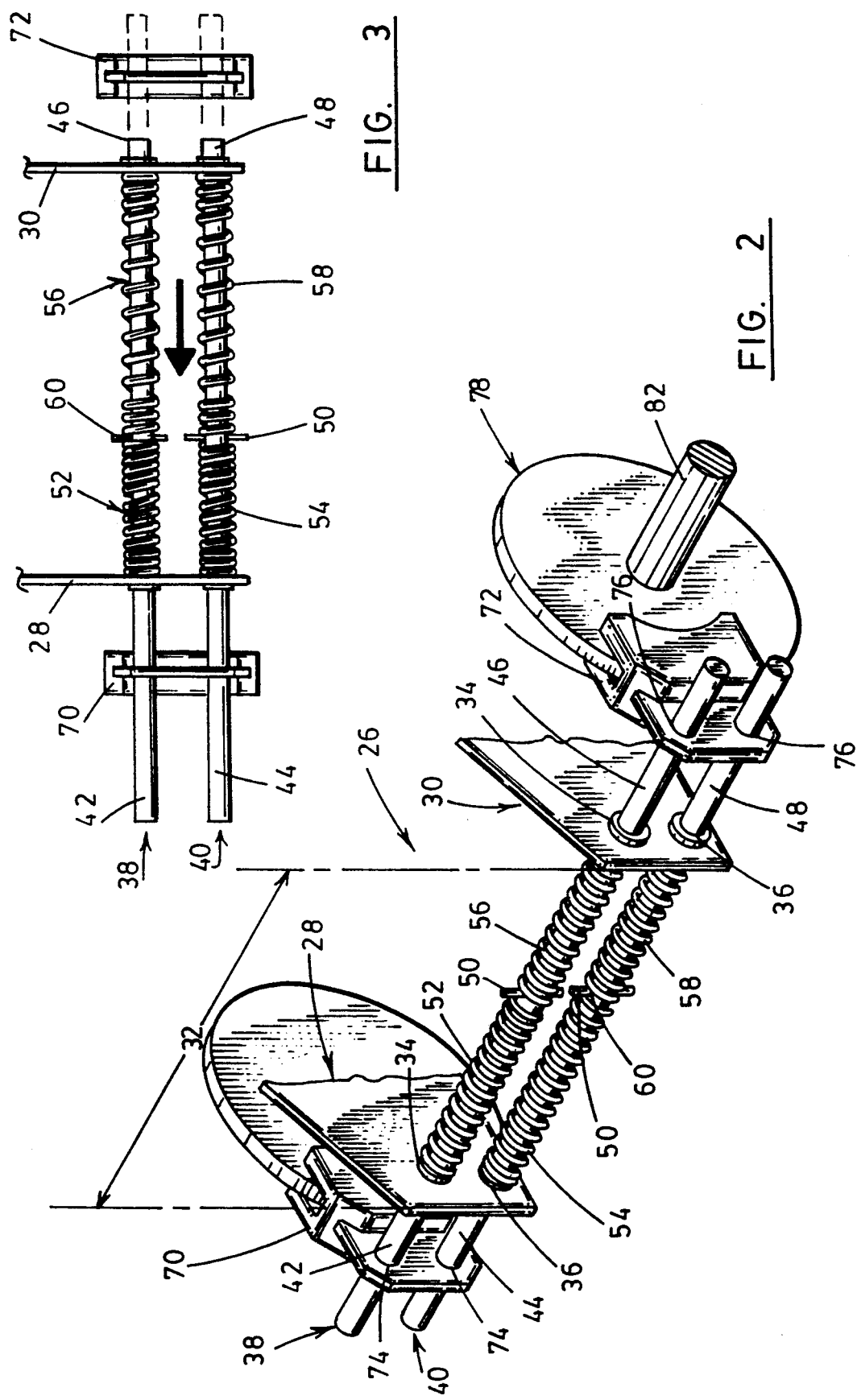

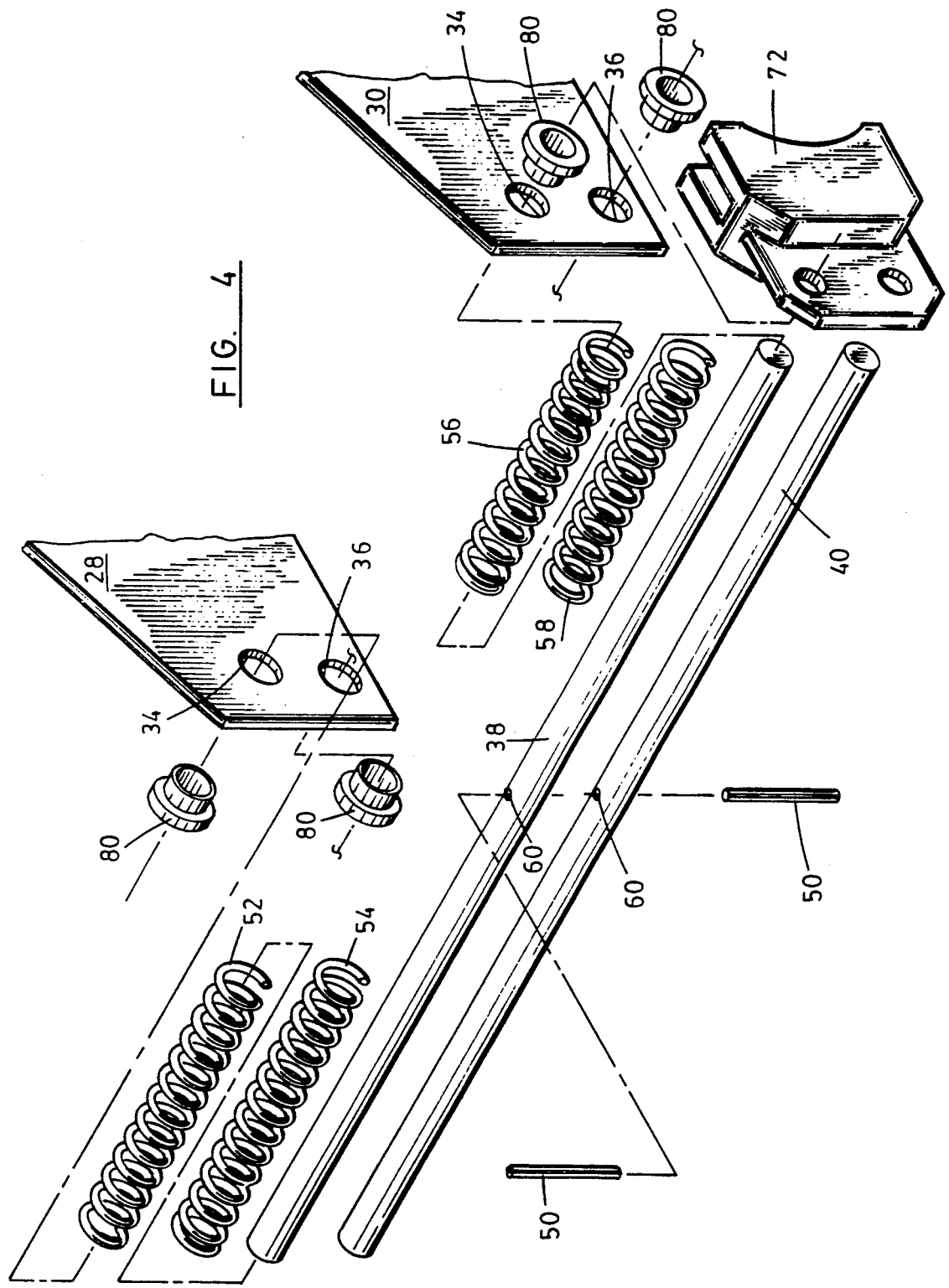

BRAKE CALIPER SUSPENSION SYSTEM FOR GOLF CARS AND UTILITY VEHICLES

BACKGROUND OF THE INVENTION

The present invention relates to a brake caliper suspension system for use with golf cars or carts, utility vehicles, and the like.

Brake caliper suspension systems used with golf cars or carts, utility vehicles, and the like, must compensate for normal wear, movement, and runout of the calipers. Prior suspension systems have utilized tabs and corresponding slots in the calipers to compensate for such wear. In such prior systems, the tabs extend from a mounting plate attached directly to the vehicle frame. The tabs slide into the caliper slots when the caliper is properly positioned about the brake disc. In this way, the caliper can slide longitudinally back and forth on the tabs as necessary to compensate for any wear, movement or runout of the caliper and its pads.

However, the tabs, calipers, and brake discs are not flexible. In effect, the brake discs hold the calipers in position on the tabs, and the tabs hold the caliper in position about the brake disc. Consequently, the calipers cannot be removed from their position without first removing the brake disc which in turn also generally requires the removal of the vehicle axle. After the axle and disc are removed, the calipers may then be slid off the tabs of the mounting plate. Much time and effort are thus required to repair or replace the brake calipers utilized in the prior systems.

SUMMARY OF THE INVENTION

In principal aspect, the improved brake caliper suspension system of the present invention provides for releasable mounting of the brake calipers that are designed and intended to be utilized in golf cars or carts, utility vehicles, and the like. This releasable mounting is accomplished by incorporating brake rods, in conjunction with springs, for engaging the brake calipers in the suspension system. When the springs are compressed, the brake rods may slide to release the brake calipers from their normal position so that they can relatively quickly and easily be removed without also requiring removal of the brake discs or the vehicle axles. Similarly, the brake calipers can be returned to their normal operating position by again compressing the springs, positioning the brake calipers in their normal position, and allowing the springs to drive the brake rods to engage the brake calipers.

An object of the present invention therefore is to provide an improved brake caliper suspension system that permits the facile removal of the brake calipers for maintenance or replacement in order to compensate for normal wear, movement and runout of the calipers. Another object is to provide easy access to the brake caliper such that no disassembly of the axle and brake disc is required for maintenance or replacement of the brake calipers.

A further object is to provide an improved suspension system for brake calipers of the type described where two brake rods pass through two plates so that the brake rods are aligned parallel to each other, where the brake rods are longer than the distance between the two plates so that the ends of the brake rods extend away from the two plates far enough to hold the brake calipers in place about the brake discs, where compression springs are mounted on and about each brake rod and located between the plates so that when the appropriate spring is compressed, the corresponding end of the brake rod can be withdrawn from its normal holding-the-caliper position thus allowing for the convenient access to and for the facile removal or replacement of the caliper.

Other objects and advantages of the present invention will become apparent from the following detailed description of the invention.

DESCRIPTION OF THE DRAWINGS

FIG. 2 is a perspective view of the improved brake caliper suspension system of the present invention;

FIG. 3 is a front elevational view of the suspension system of the present invention with the springs compressed to release the brake caliper from its normal position; and FIG. 4 is an exploded perspective view of the suspension system of the present invention.

DETAILED DESCRIPTION OF THE PREFERRED EMBODIMENT OF THE INVENTION

Figure 1:
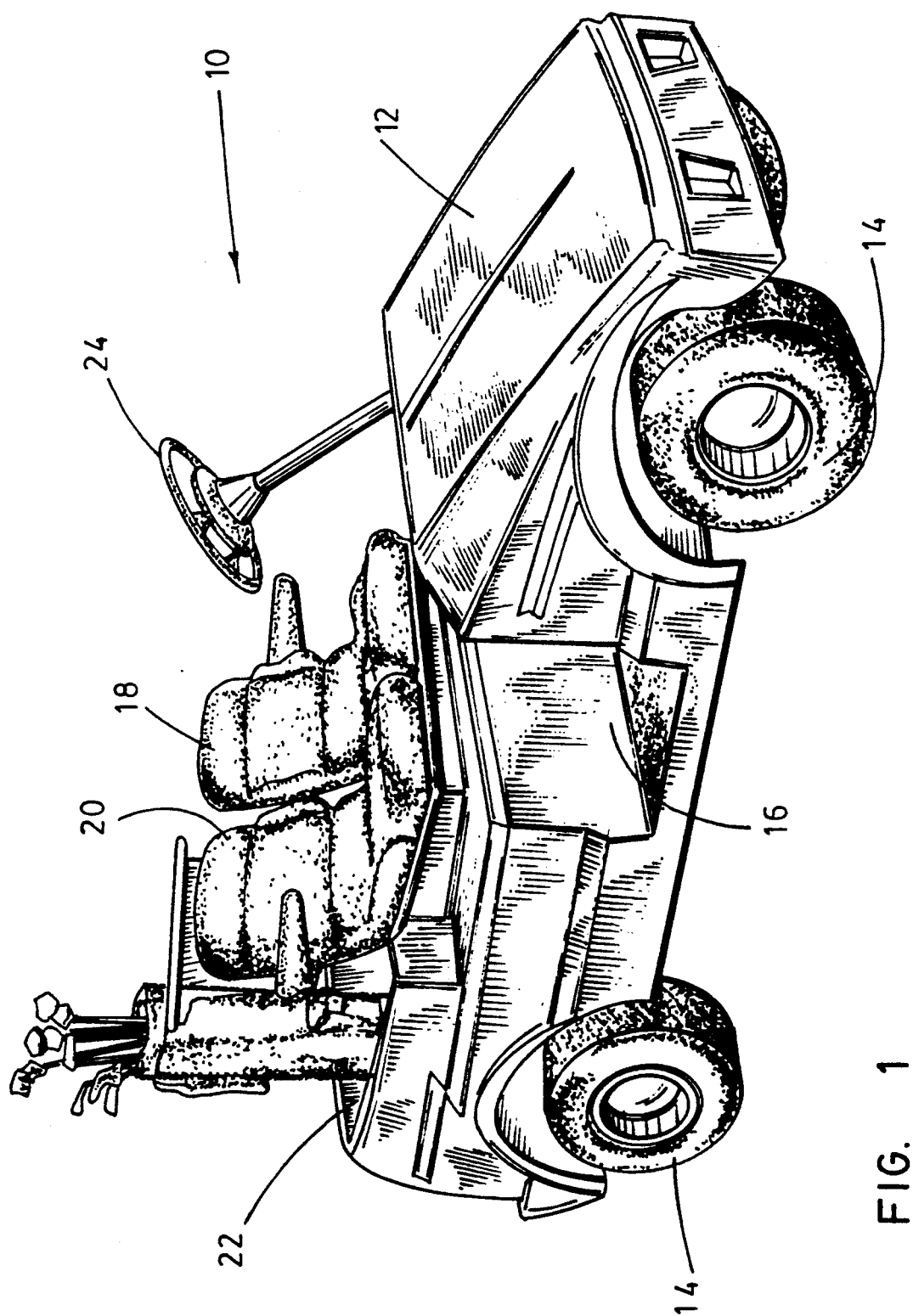
FIG. 1 is a perspective view of a golf car or cart with which the brake caliper suspension system of the present invention may be used.

A golf car or cart vehicle, on which and with which the present invention may be utilized, is shown generally at 10 in FIG. 1. Except as hereinafter noted, the golf vehicle 10 is of conventional design and construction and includes a molded plastic body 12 that is supported by a frame, not shown. The vehicle 10 is powered by a motor and transmission, also not shown. Four wheels 14 are mounted on axles (one of which being shown at 82 in FIG. 2) that are connected with the frame. The body 12 includes a compartment 16 having seats 18 and 20, for a driver and a passenger, respectively. The body 12 also includes a rear compartment 22 for storing golf clubs and the like. A steering wheel 24 permits the driver to steer the golf vehicle 10.

The improved suspension system of the present invention is indicated at 26 in FIGS. 2–4. The system 26 comprises a first plate 28 and a second plate 30. The first and second plates 28 and 30 may be mounted directly to the frame of the vehicle 10 of FIG. 1 or directly to its transmission. Both plates are aligned substantially parallel to each other at a predetermined distance indicated at 32. This distance 32 will depend upon the dimensions of the vehicle 10 with which the suspension system 26 will be used.

The plates 28 and 30 have aligned pairs of upper and lower apertures 34 and 36 that receive and support two straight brake rods 38 and 40, respectively, so that the rods are maintained substantially parallel to each other. The brake rods 38 and 40 are longer than the distance 32 and each of the ends of the rods extend or pass through the aligned pairs of apertures 34 and 36 a second predetermined distance as hereinafter explained. More specifically, a first or left (as shown in FIGS. 2 and 3) end 42 of brake rod 38 and a first or left (as shown in FIGS. 2 and 3) end 44 of brake rod 40 extend away from plate 28 through apertures 34 and 36 in that plate. A second or right (as shown in FIGS. 2 and 3) end 46 of brake rod 38 and a second or right (as shown in FIGS. 2 and 3) end 48 of brake rod 40 extend away from plate 30 through apertures 34 and 36 in that plate.

The brake rods 38 and 40 each also have a transverse bore, adjacent their midpoint. Each of these bores receives and maintains a roll pin 50.

Preferably, the brake rods 38 and 40 will have a ⅜-inch outer diameter, and the transverse bore will be drilled in the center of their lengths to receive the roll pins 50. Also, the roll pins 50 will preferably have a diameter of 3/16 inch and a length of 1¼ inches. Of course, these dimensions can be modified for larger or smaller brakes and vehicles.

First and second coil compression springs 52 and 54 are disposed about each of rods 38 and 40, respectively, and are of a length so that they extend between the plate 28 and the pins 50 in the rods. Similarly, third and fourth coil compression springs 56 and 58 are disposed about each of the rods 38 and 40, respectively, and are of a length so that they extend between the plate 30 and the pins 50. The forces normally exerted by the springs 52, 54, 56, and 58 are substantially equal so that the roll pins 50 will remain centered or approximately equidistant between the first plate 28 and the second plate 30. That is, the brake rod 38 is centered by the springs 52 and 56, and the brake rod 40 is centered by springs 54 and 58. The substantially equal forces exerted by the springs 52 and 56 further insure that the ends 42 and 46 of brake rod 38 will extend a substantially equal length from and beyond the plates 28 and 30, respectively. Similarly, the forces exerted by the springs 54 and 58 insure that the ends 44 and 48 of brake rod 40 will extend a substantially equal length from and beyond the plates 28 and 30, respectively.

The first ends 42 and 44 of brake rods 38 and 40 may selectively be retracted through apertures 34 and 36 in the plate 28 by compressing the springs 56 and 58, respectively. Similarly the second ends 46 and 48 of brake rods 38 and 40 may selectively be retracted through apertures 34 and 36 in the plate 30 by compressing springs 52 and 54, respectively. The springs 52, 54, 56, and 58 preferably are springs sold under the trademark "Century #1547", but can also be heavier or lighter depending on the intended usage of the system 26.

A first brake caliper 70 and a second brake caliper 72 are of conventional design and function, except as otherwise noted. They are mounted on the first and second ends of the brake rods 38 and 40. Specifically, the first brake caliper 70 includes a pair of brake holes 74 that are axially aligned with the apertures 34 and 36 in plate 28 and that are designed to receive first ends 42 and 44 of the brake rods 38 and 40. The second brake caliper 72 includes a pair of brake holes 76 that are axially aligned with the apertures 34 and 36 in the plate 30 and that are designed to receive second ends 46 and 48 of the brake rods 38 and 40. The calipers 70 and 72 are designed to slide onto and with respect to first ends 42 and 44 and second ends 46 and 48, respectively. In other words, the calipers 70 and 72 can slide back and forth on the rods 38 and 40 to account for any movement of the calipers 70 and 72 or any brake disc 78 runout.

The preferred mounting position for the calipers 70 and 72 is a front mounting. However, and as will be apparent to those skilled in this art, the calipers 70 and 72 can be positioned anywhere along the circumference of the brake discs 78 with only minor modifications to the suspension system 26.

Calipers sold under the trademark "Hayes 1100" are preferred. These commercially available calipers must, as noted above, be modified by the addition of the brake holes 74 and 76 which will accept the ends of the brake rods. The calipers can be either mechanical or hydraulic, and the brake holes 74 and 76 can be either cast or drilled into the backs of the calipers.

As best illustrated in FIG. 3, the first and second springs 52 and 54 may be compressed to release the second brake caliper 72 from its normal position adjacent t and in working relationship about the brake disc 78 mounted on the axle 82. When it becomes necessary for maintenance or replacement, first brake caliper 70 and/or second brake caliper 72 can be easily and conveniently removed from their normal position by compressing the appropriate set of springs (third and fourth springs 56 and 58 or first and second springs 52 and 54, respectively). For example, the compression of first and second springs 52 and 54 retracts second ends 46 and 48 of the brake rods 38 and 40 from the brake-rod holes 76 thus disengaging the second ends 46 and 48 from the second brake caliper 72. When the caliper 72 is again ready for repositioning the reverse procedure is carried out. Specifically, first and second springs 52 and 54 are compressed, a new or repaired second caliper 72 is placed in its normal position about the brake disc 78, and first and second springs 52 and 54 are then relaxed thus allowing second ends 46 and 48 of the brake rods 38 and 40 to extend away from second plate 30 and to again engage the brake rod holes 76 of the second caliper 72.

To prevent metal-to-metal contact and also to eliminate rattles, before the brake rods 38 and 40 are fitted through apertures 34 and apertures 36 of plates 28 and 30, these apertures 34 and 36 may be fitted with conventional bushings 80 as best illustrated in FIG. 4. These bushings 80 are preferably made of 6/6 nylon or other engineered plastic. Before positioning the brake rods 38 and 40 between plates 28 and 30, the first and second springs 52 and 54, and the third and fourth springs 56 and 58, are mounted on and about the brake rods 38 and 40, respectively. Each brake rod is also provided with the roll pin 50 at its midpoint 60. Again, and as noted above, the roll pins 50 are used to assist in centering the brake rods between the plates 28 and 30.

Upon assembling the brake caliper suspension system 26, i.e., properly positioning brake rods 38 and 40 with their various springs and pins between plates 28 and 30, the first ends 42 and 44 and the second ends 46 and 48 extend away from plates 28 and 30, respectively. The first ends 42 and 44 slidably engage the first brake caliper 70, and the second ends 46 and 48 slidably engage the second brake caliper 72. The brake calipers 70 and 72 are, in turn, operatively positioned adjacent to the brake discs 78.

The improved suspension system 26, as disclosed hereinabove, compensates for normal wear, movement, and runout of the calipers and caliper pads as well as providing convenient access to the brake calipers for maintenance or replacement. Thus, suspension system 26, with only minor modifications, can be adapted for use with any type of brake caliper, at any position along the circumference of the brake disc, and various types of vehicles. The scope of the present invention is, therefore, indicated by the following claims rather than the foregoing detailed description of the preferred embodiment. All changes coming within the meaning and range of equivalency of the claims are intended to be included therein.

What is claimed is:

1. A brake caliper suspension system adapted for mounting brake calipers for cooperation with brake discs used on a golf car, a utility vehicle, and similar over-ground traveling vehicles having an engine, a frame, a body supported on the frame, an axle mounted on the frame, first and second wheels operatively connected with the axle so as to permit the body to travel over the ground, first and second brake discs associated with the first and second wheels, respectively, for braking the speed of the wheels, and a transmission for selectively permitting the engine to drive the wheels, comprising:

a first plate having at least one aperture therein, the first plate being fixedly attached to selectively one of the frame and transmission;

a second plate that is aligned substantially parallel to the first plate, that is spaced from the first plate a preselected distance and that has at least one aperture therein, with the apertures in the first and second plates being axially aligned, the second plate being fixedly attached to selectively one of the frame and transmission;

a continuous brake caliper-supporting rod having a first end and a second end, with the brake rod passing through the one aperture of the first plate and the one aperture of the second plate and with the brake rod being sufficiently longer than the preselected distance between the first and second plates such that its first end extends beyond the first plate and its second end extends beyond the second plate;

a first brake caliper having an opening for slidably receiving the first end of the brake rod, the first brake caliper normally being in a position adjacent to and in an operably working relationship with the first brake disc so that the first brake caliper may operably engage the first brake disc to brake the first wheel;

a second brake caliper having an opening for slidably receiving the second end of the brake rod, the second brake caliper normally in a position adjacent to and in an operably working relationship with the second brake disc so that the second brake caliper may operably engage the second brake disc to brake the second wheel; and means for maintaining the brake rod in a normal, central position between and with respect to the first plate and the second plate and for permitting the brake rod to be slidably moved axially selectively in one direction from its normal position so that one of its ends is removed from the opening in the brake caliper positioned in the opposite direction whereby the brake caliper associated with the one end of the brake rod may be removed for repair or replacement before the brake rod is subsequently returned to its normal position.

2. The brake caliper suspension system of claim 1 wherein the first plate has a first aperture and a second aperture; wherein the second plate has a first aperture and a second aperture; wherein the first aperture of the second plate is axially aligned with the first aperture of the first plate; and wherein the second aperture of the second plate is axially aligned with the second aperture of the first plate; and further comprising a continuous first brake caliper-supporting rod having a first end and a second end, with the first brake rod passing through the first aperture of the first plate and the first aperture of the second plate and with the first brake rod being sufficiently longer than the preselected distance between the first and second plates such that its first end extends beyond the first plate and its second end extends beyond the second plate; and a continuous second brake caliper-supporting rod having a first end and a second end, with the second brake rod passing through the second aperture of the first plate and the second aperture of the second plate and with the second brake rod being sufficiently longer than the preselected distance between the first and second plates such that its first end extends beyond the first plate and its second end extends beyond the second plate;

and wherein the first brake caliper has two openings to slidably engage the first ends of the brake rods;

and wherein the second brake caliper has two openings to slidably engage the second ends of the brake rods.

3. The brake caliper suspension system of claim 1 wherein the central-maintaining means comprises a midpoint in the continuous brake rod, and a roll pin hole at the midpoint; wherein a roll pin is mounted in the roll pin hole; wherein a first spring is mounted on and about the brake rod and is positioned between the first plate and the roll pin; and wherein a second spring is mounted on and about the brake rod and is positioned between the roll pin and the second plate.

4. A brake caliper suspension system adapted for use with a golf cart, a utility vehicle, and similar over-ground traveling vehicles having an engine, a frame, a body supported on the frame, an axle mounted on the frame, first and second wheels operatively connected with the axle so as to permit the body to travel over the ground, first and second brake discs associated with the first and second wheels, respectively, for braking the speed of the wheels, and a transmission for selectively permitting the engine to drive the wheels, comprising a first plate having a first aperture and a second aperture, the first plate being fixedly attached to selectively one of the frame and transmission;

a second plate that is aligned substantially parallel to the first plate, that is spaced from the first plate a preselected distance, and that has a first aperture and a second aperture, with the first aperture of the second plate being axially aligned with the first aperture of the first plate and with the second aperture of the second plate being axially aligned with the second aperture of the first plate, the second plate being fixedly attached to selectively one of the frame and transmission;

a continuous first brake caliper-supporting rod and a continuous second brake caliper-supporting rod, each brake rod having a first end and a second end, with each brake rod engaging one aperture of the first plate and one aperture of the second plate such that the brake rods are maintained substantially parallel to each other, with each brake rod being sufficiently longer than the preselected distance between the first and second plates such that the first ends extend away from the first plate and the second ends extend away from the second plate, and with each brake rod further having a roll pin hole at its midpoint;

a roll pin for engaging the roll pin hole in each brake rod;

a first spring mounted on and about the first brake rod and positioned between the first plate and the roll pin;

a second spring mounted on and about the second brake rod and positioned between the first plate and the roll pin;

a third spring mounted on and about the first brake rod and positioned between the roll pin and the second plate;

a fourth spring mounted on and about the second brake rod and positioned between the roll pin and the second plate;

a first brake caliper having two openings for slidably engaging the first ends of the brake rods, the first brake caliper normally in a position adjacent to and in working relationship with the first brake disc; and a second brake caliper having two openings for slidably engaging the second ends of the brake rods, the second brake caliper normally in a position adjacent to and in working relationship with the second brake disc;

whereby selectively one of the first and second ends of the first and second brake rods may be slidably retracted from the opposed brake caliper such that when the brake rods are retracted the caliper may be removed for repair or replacement and subsequently returned to its normal position.

* * * * *